(12) United States Patent
Pleskot et al.

(10) Patent No.: US 12,643,437 B2
(45) Date of Patent: Jun. 2, 2026

(54) MULTI-PIVOT ANGLED VEHICLE SEAT KINEMATICS

(71) Applicant: Atieva, Inc., Newark, CA (US)

(72) Inventors: Andrzej Pleskot, Seeheim-Jugenheim (DE); Virat Panchani, Fremont, CA (US)

(73) Assignee: Atieva, Inc., Newark, CA (US)

( * ) Notice: Subject to any disclaimer, the term of this patent is extended or adjusted under 35 U.S.C. 154(b) by 180 days.

(21) Appl. No.: 18/508,462

(22) Filed: Nov. 14, 2023

(65) Prior Publication Data

US 2024/0157856 A1 May 16, 2024

Related U.S. Application Data

(60) Provisional application No. 63/383,615, filed on Nov. 14, 2022.

(51) Int. Cl.
| | |
|---|---|
| *B60N 2/30* | (2006.01) |
| *B60N 2/02* | (2006.01) |
| *B60N 2/04* | (2006.01) |
| *B60N 2/16* | (2006.01) |

(52) U.S. Cl.
CPC ....... *B60N 2/1695* (2013.01); *B60N 2/02258* (2023.08); *B60N 2/045* (2013.01); *B60N 2/1635* (2013.01); *B60N 2/3068* (2013.01); *B60N 2/307* (2013.01)

(58) Field of Classification Search
CPC .................. B60N 2/307; B60N 2/3068; B60N 2002/0208; B60N 2/045
See application file for complete search history.

(56) References Cited

U.S. PATENT DOCUMENTS

| | | | | |
|---|---|---|---|---|
| 2016/0325642 A1* | 11/2016 | Fitzpatrick | ......... | B60N 2/02246 |
| 2021/0237629 A1* | 8/2021 | Muck | ..................... | B60N 2/525 |
| 2022/0363170 A1* | 11/2022 | Lindenberg | ............ | B60N 2/206 |
| 2023/0068286 A1* | 3/2023 | Kuntz | .................... | B60N 2/166 |

FOREIGN PATENT DOCUMENTS

| | | | | | |
|---|---|---|---|---|---|
| CN | 101844525 A | * | 9/2010 | ............. | B60N 2/161 |
| DE | 10236613 A1 | | 2/2004 | | |
| FR | 2887501 A1 | * | 12/2006 | ............. | B60N 2/307 |
| JP | 07108864 A | * | 4/1995 | | |
| WO | WO-2007016625 A1 | * | 2/2007 | ............. | B60N 2/161 |
| WO | 2007128367 A1 | | 11/2007 | | |
| WO | 2010075900 A1 | | 7/2010 | | |

OTHER PUBLICATIONS

International Search Report and Written Opinion for PCT Application No. PCT/US2023/079591, mailed on Mar. 5, 2024, 11 pages.

* cited by examiner

*Primary Examiner* — Timothy J Brindley

(74) *Attorney, Agent, or Firm* — Brake Hughes Bellermann LLP

(57) ABSTRACT

A vehicle seat in part comprises an eight-pivot angled assembly comprising: front and rear subassemblies each mounted to a cushion frame at a non-perpendicular angle to floor rails, each of the front and rear subassemblies comprising upper pivots and lower pivots coupled to each other respective links, a crossmember coupling links to each other. An electric motor is coupled to the eight-pivot angled assembly and configured to actuate the front and rear subassemblies into a first position, and into a second position where the cushion frame and a cushion are positioned further inboard in the vehicle than in the first position.

21 Claims, 5 Drawing Sheets

VIEW A

VIEW B

MULTI-PIVOT ANGLED VEHICLE SEAT KINEMATICS

CROSS-REFERENCE TO RELATED APPLICATION

This application claims benefit, under 35 U.S.C. § 119, of U.S. Provisional Patent Application No. 63/383,615, filed on Nov. 14, 2022, entitled "MULTI-PIVOT ANGLED VEHICLE SEAT KINEMATICS", the disclosure of which is incorporated by reference herein in its entirety.

TECHNICAL FIELD

This document relates to multi-pivot angled vehicle seat kinematics.

BACKGROUND

Some vehicle seats have fore-aft adjustment by tracks and additional two cross-car tracks or two bars with linear bearings to provide side movement. This concept can work if the fore-aft tracks can maintain the full adjustment range in both directions. Due to electric vehicle architecture and/or other circumstances, long travel range tracks sometimes cannot be used. For example, due to rear wheel housings and/or a floor cross bar, seats cannot be fully adjusted by fore-aft track movement.

SUMMARY

In an aspect, a vehicle seat comprises: a cushion supported by a cushion frame; an eight-pivot angled assembly configured for fore-aft positioning along first and second floor rails parallel to each other in a vehicle, wherein the cushion and the cushion frame are aligned with the first and second floor rails, the eight-pivot angled assembly comprising: a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear crossmember coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position.

Implementations can include any or all of the following features. The cushion frame includes a front frame crossmember that is perpendicular to the first and second floor rails, and wherein the front frame crossmember has a first front bracket for the first front upper pivot, and a second front bracket for the second front upper pivot, the first and second front brackets positioned on opposite sides of the front frame crossmember to create the non-perpendicular angle. The cushion frame further includes a rear frame crossmember that is perpendicular to the first and second floor rails, and wherein the rear frame crossmember has a first rear bracket for the first rear upper pivot, and a second rear bracket for the second rear upper pivot, the first and second rear brackets positioned on opposite sides of the rear frame crossmember to create the non-perpendicular angle. The first front lower pivot and the first rear lower pivot are positioned vertically above the first floor rail in the first and second positions. The second front lower pivot and the second rear lower pivot are not positioned vertically above the second floor rail in the first and second positions, and wherein the front subassembly further comprises (i) a front lateral bracket coupling the second front lower pivot to the second floor rail, and (ii) a rear lateral bracket coupling the second rear lower pivot to the second floor rail. The vehicle seat further comprises a link to be actuated by the electric motor to move the front and rear subassemblies into the first and second positions. The electric motor is configured to lengthen or shorten the link. The link comprises a telescopic link. The electric motor has a lead screw. The electric motor is a spindle motor or a linear actuator. The link extends between the rear crossmember and a position on the cushion frame. The position is between the first front upper pivot and the second front upper pivot. The link extends between the rear crossmember and a pivot on the first floor rail. The link extends between the front and rear crossmembers. The link extends between the front crossmember and a pivot on the first floor rail. The link extends between the front crossmember and a position on the cushion frame. The first front link, the second front link, the first rear link, and the second rear link, all have a common length. The first front lower pivot and the second front lower pivot have a first height compared to the first and second floor rails. The first rear lower pivot and the second rear lower pivot have the first height compared to the first and second floor rails. The first rear lower pivot and the second rear lower pivot have a second height compared to the first and second floor rails, the second height different from the first height. The vehicle seat is a second-row seat for the vehicle.

BRIEF DESCRIPTION OF DRAWINGS

Like reference symbols in the various drawings indicate like elements.

DETAILED DESCRIPTION

Figure 1:
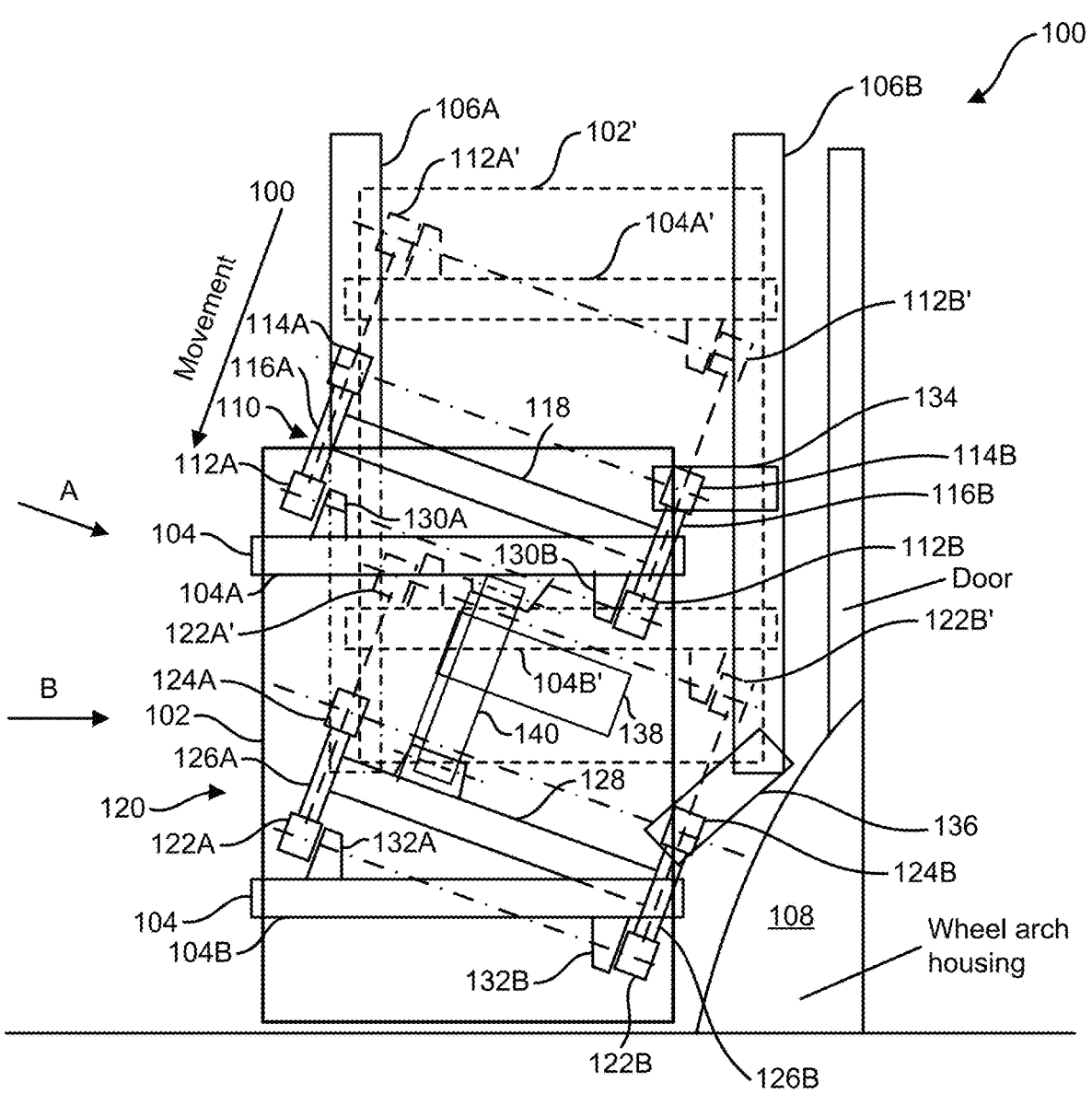
FIG. 1 schematically shows an example of eight-pivot angled vehicle seat kinematics.

This document describes examples of systems and techniques for multi-pivot angled vehicle seat kinematics. One issue that can arise in vehicle design is that wheel housings (e.g., rear wheel housings) and/or body structures such as cross bars can interfere with the intended or desired adjustment or movement of the vehicle seats. For example, fore-aft track movement may not be available to fully realize the seat operations. In some implementations, a vehicle seat can have kinematics with angled pivot points, resulting in a rear-inboard additional movement of the seat. For example, this can allow the seat movement to avoid the influence of a wheel housing or cross bars.

Additional fore-aft travel can be realized by multi-pivot angled kinematics. This can be accomplished using multiple subassemblies with multiple pivots each. For example, two subassemblies can have four pivots each. An axis of a front subassembly can be parallel to an axis of a rear subassembly, creating parallelogram-based kinematics. The front and rear subassemblies can be angled relative to a vehicle driving direction and can be offset from each other. A motor (e.g., a spindle motor) can be positioned between the subassemblies to drive the kinematics. For example, the motor can adjust a length of a link to effect an angled movement of a seat base.

The present subject matter can be applied to any kind of vehicle seat. In some implementations, a captain seat or a lounge seat can be provided. For example, the seat can be positioned in a second row of the vehicle.

Implementations can provide any or all of the following advantages. Improved room for an occupant (e.g., comfort space for a rear occupant in a lounge position) can be provided by diagonal movement. The use of linear bearings can be avoided. The system can be made resistant or impervious to dust and salt contamination. Squeak and rattle issues can be reduced or eliminated. Lateral stiffness can be improved. Smooth movement of the kinematics can be ensured. The assembly can have improved rigidity.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 schematically shows an example of eight-pivot angled vehicle seat kinematics 100. The eight-pivot angled vehicle seat kinematics 100 can be used with one or more other examples described elsewhere herein. The present example is described with reference to a vehicle seat that is here shown in a top view, where a vehicle exterior door is indicated on the right side of the drawing. Only part of the vehicle is shown. Some components or features of the vehicle seat are shown at least partially transparent for clarity.

The vehicle seat has a seat cushion 102 that is here represented by a rectangle with a thick outline. The vehicle seat can have a seatback which is not shown for simplicity. The seat cushion 102 is supported by a cushion frame 104. For example, the cushion frame 104 can include a front frame crossmember 104A and a rear frame crossmember 104B.

The vehicle seat can be configured to be mounted to, and be relocated fore-aft in the vehicle using, one or more floor rails. Here the vehicle includes floor rails 106A-106B that are parallel to each other. Each of the floor rails 106A-106B is here represented by a rectangle.

The geometry of the vehicle design, such as the structure formed by its body-in-white, can create challenges for the placement of the floor rails 106A-106B, and/or for realizing particular moveability of the vehicle seat given a particular floor rail placement. In some implementations, a vehicle part 108 can interfere with the vehicle seat movement. In some implementations, the vehicle part 108 is part of a wheel body structure, such as an arched housing for the wheel(s). For example, the length and placement of the floor rail 106B in the x-direction of a Cartesian vehicle coordinate system (i.e., the direction of travel, or vertically in the present illustration) can be restricted by the presence of the vehicle part 108. The floor rail 106A, by contrast, is positioned further inboard than the floor rail 106B and as such avoids the influence of the vehicle part 108. However, relocating the floor rail 106B further inboard may not be practical or desirable. For example, to accommodate different types of seats as an alternative to captain or lounge seats (e.g., a bench seat), it may be preferred to maintain a specified lateral separation between the floor rails 106A-106B. As another example, structures in the vehicle body may make it impossible or undesirable to move the floor rail 106A and/or 106B further away from the vehicle part 108. The present subject matter can provide for multi-pivot angled kinematics to allow a vehicle seat, such as the one in the present example, to be moved around, and thereby avoid the effects of, interfering structures such as the vehicle part 108.

The vehicle seat is shown with the seat cushion 102 in a position toward the rear of the vehicle (e.g., a rearmost position). A position 102' is here represented by a rectangle with a dashed outline and represents the vehicle seat with the seat cushion 102 in a position toward the front of the vehicle (e.g., a frontmost position). The position 102' can be symmetric about the floor rails 106A-106B, whereas the seat cushion 102 is shown as being located more inboard than the position 102'. The eight-pivot angled vehicle seat kinematics 100 provide diagonal transition of the seat cushion 102 to and from the position 102'. This movement can involve a minor elevation and lowering of the seat cushion 102, in addition to the lateral relocation and fore-aft movement. For example, the distance of the fore-aft movement can be a multiple of the distance of the lateral relocation (e.g., a 3:1 ratio).

The seat cushion 102 and the cushion frame 104 are aligned with the floor rails 106A-106B. For example, the left and right sides of the seat cushion 102 can be essentially parallel with the floor rails 106A-106B. As another example, each of the front and rear frame crossmembers 104A-104B can be essentially perpendicular to the floor rails 106A-106B.

The vehicle seat includes a front subassembly 110 that is mounted to the cushion frame 104 at a non-perpendicular angle to the floor rails 106A-106B (e.g., as shown, or at another angle). The front subassembly 110 comprises a front upper pivot 112A and a front lower pivot 114A coupled to each other by a front link 116A. The front subassembly 110 comprises a front upper pivot 112B and a front lower pivot 114B coupled to each other by a front link 116B. The front subassembly 110 comprises a front crossmember 118 coupling the front links 116A-116B to each other. For example, the front crossmember 118 forms the non-perpendicular angle with each of the floor rails 106A-106B.

The vehicle seat includes a rear subassembly 120 that is mounted to the cushion frame 104 at the non-perpendicular angle to the floor rails 106A-106B (e.g., as shown, or at another angle the same as that of the front subassembly 110). The rear subassembly 120 comprises a rear upper pivot 122A and a rear lower pivot 124A coupled to each other by a rear link 126A. The subassembly 120 comprises a rear upper pivot 122B and a rear lower pivot 124B coupled to each other by a rear link 126B. The subassembly 120 comprises a rear crossmember 128 coupling the rear links 126A-126B to each other. For example, the rear crossmember 128 forms the non-perpendicular angle with each of the floor rails 106A-106B.

Each of the front and rear subassemblies 110 and 120 can be an H bracket. The front and rear subassemblies 110 and 120 can have geometries corresponding to each other to ensure that the seat cushion 102 does not tilt during transition. For example, the front links 116A-116B, and the rear links 126A-126B, can all have essentially a common length. As shown here, the front lower pivots 114A-114B, and the rear lower pivots 124A-124B, can all be at essentially the same height compared to the floor rails 106A-106B (although the position is not necessarily directly above the respective rail in the vertical direction).

The front frame crossmember 104A can have a front bracket 130A for the front upper pivot 112A, and a front bracket 130B for the front upper pivot 112B. The front brackets 130A-130B can be positioned on opposite sides of the front frame crossmember 104A to create the non-perpendicular angle. The front brackets 130A-130B can be, but are not necessarily, essentially identical to each other.

The rear frame crossmember 104B can have a rear bracket 132A for the rear upper pivot 122A, and a rear bracket 132B for the rear upper pivot 122B. The rear brackets 132A-132B can be positioned on opposite sides of the rear frame crossmember 104B to create the non-perpendicular angle. The rear brackets 132A-132B can be, but are not necessarily, essentially identical to each other.

In the illustrated example, movement of the seat cushion 102 to the position 102' does not involve any of the translation of the vehicle seat along the floor rails 106A-106B that may occur. Rather, the position 102' can be accomplished by pivoting of the front links 116A-116B, and the rear links 126A-126B, about their respective pivots. A position 112A' represents the front upper pivot 112A when the seat cushion 102 is in the position 102'. A position 112B' represents the front upper pivot 112B when the seat cushion 102 is in the position 102'. A position 122A' represents the rear upper pivot 122A when the seat cushion 102 is in the position 102'. A position 122B' represents the rear upper pivot 122B when the seat cushion 102 is in the position 102'. A position 104A' represents the front frame crossmember 104A when the seat cushion 102 is in the position 102'. A position 104B' represents the rear frame crossmember 104B when the seat cushion 102 is in the position 102'.

The front lower pivot 114A and the rear lower pivot 124A can be positioned vertically above the floor rail 106A in all positions of the vehicle seat (e.g., both with the seat cushion 102 positioned as shown, and also in the position 102'). For example, the front lower pivot 114A and the rear lower pivot 124A are mounted to a common slider, or to respective sliders, on the floor rail 106A.

The front lower pivot 114B and the rear lower pivot 124B may not be positioned vertically above the floor rail 106B. In some implementations, the front subassembly 110 has a front lateral bracket 134 coupling the front lower pivot 114B to the floor rail 106B. In some implementations, the rear subassembly 120 has a rear lateral bracket 136 coupling the rear lower pivot 124B to the floor rail 106B. The front and rear lateral brackets 134 and 136 can be different from each other, or can be essentially identical. For example, at least one of the front and rear lateral brackets 134 and 136 can be essentially perpendicular to the floor rail 106B. As another example, at least one of the front and rear lateral brackets 134 and 136 can form a non-perpendicular angle to the floor rail 106B. For example, the front and rear lateral brackets 134 and 136 are mounted to a common slider, or to respective sliders, on the floor rail 106B.

The vehicle seat can have an electric motor 138 that facilitates the eight-pivot angled vehicle seat kinematics 100. The electric motor 138 can actuate a link 140 to move the front and rear subassemblies 110 and 120 (e.g., to move the seat cushion 102 to or from the position 102'). For example, the electric motor 138 can be configured to lengthen or shorten the link 140. The link 140 can include a telescopic link. The link 140 can extend between the rear crossmember 128 and a position on the cushion frame 104. In some implementations, the position is on the front frame crossmember 104A. For example, the position can be between the front upper pivots 112A and 112B. Any of multiple kinds of electric motor can be used. In some implementations, the electric motor 138 has a lead screw. In some implementations, the electric motor 138 is a spindle motor or a linear actuator. In some implementations, the link 140 can instead extend elsewhere, such as between the front crossmember 118 and a position on the cushion frame 104.

The above examples illustrate that a vehicle seat (e.g., the vehicle seat in FIG. 1) can include a cushion (e.g., the seat cushion 102) supported by a cushion frame (e.g., the cushion frame 104). The vehicle seat can include an eight-pivot angled assembly (e.g., as shown) configured for fore-aft positioning along first and second floor rails (e.g., the floor rails 106A-106B) parallel to each other in a vehicle. The cushion and the cushion frame are aligned with the first and second floor rails. The eight-pivot angled assembly includes a front subassembly (e.g., the front subassembly 110) mounted to the cushion frame at a non-perpendicular angle to the first and second floor rails. The front subassembly includes a first front upper pivot (e.g., the front upper pivot 112A) and a first front lower pivot (e.g., the front lower pivot 114A) coupled to each other by a first front link (e.g., the front link 116A). The front subassembly includes a second front upper pivot (e.g., the front upper pivot 112B) and a second front lower pivot (e.g., the front lower pivot 114B) coupled to each other by a second front link (e.g., the front link 116B). The front subassembly includes a front crossmember (e.g., the front crossmember 118) coupling the first and second front links to each other. The eight-pivot angled assembly includes a rear subassembly (e.g., the rear subassembly 120). The rear subassembly includes a first rear upper pivot (e.g., the rear upper pivot 122A) and a first rear lower pivot (e.g., the rear lower pivot 124A) coupled to each other by a first rear link (e.g., the rear link 126A). The rear subassembly includes a second rear upper pivot (e.g., the rear upper pivot 122B) and a second rear lower pivot (e.g., the rear lower pivot 124B) coupled to each other by a second rear link (e.g., the rear link 126B). The rear subassembly includes a rear crossmember (e.g., the rear crossmember 128) coupling the first and second rear links to each other. The vehicle seat includes an electric motor (e.g., the electric motor 138) coupled to the eight-pivot angled assembly and configured to actuate (e.g., using the link 140) the front and rear subassemblies into a first position (e.g., the position 102'), and into a second position (e.g., with the seat cushion 102 as shown) where the cushion frame and the cushion are positioned further inboard in the vehicle than in the first position.

Figure 2:
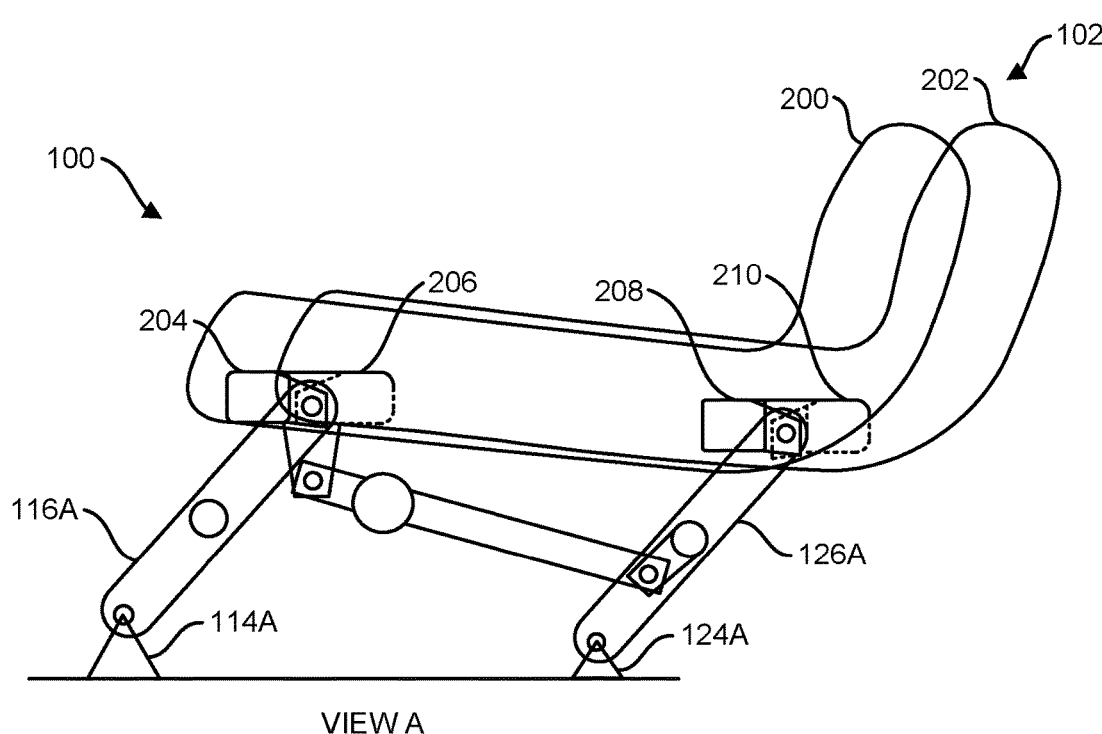
FIGS. 2-3 show examples of the eight-pivot angled vehicle seat kinematics of FIG. 1 from viewpoints A and B, respectively.
Figure 3:
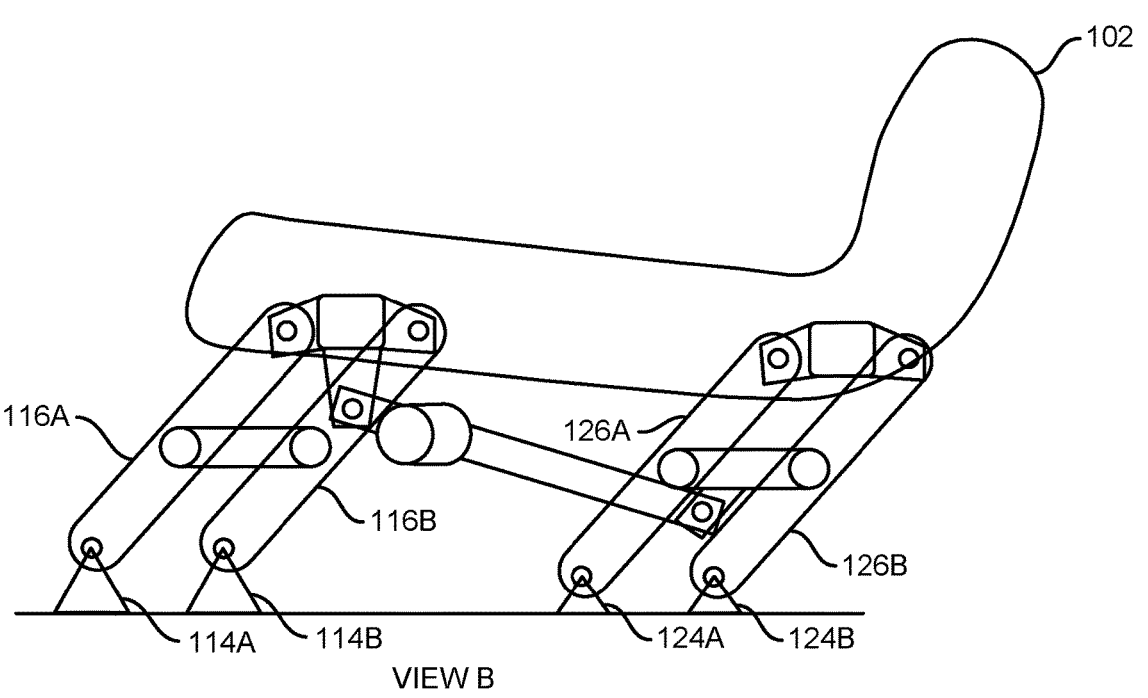

The eight-pivot angled vehicle seat kinematics 100 is further exemplified with descriptions corresponding to different planes in the illustration, first from a direction A (in FIG. 2) that is parallel with rotational axes of the pivots of the front and rear subassemblies 110 and 120, and thereafter from a direction B (in FIG. 3) that is perpendicular with each of the floor rails 106A-106B. Thus, FIGS. 2-3 show examples of the eight-pivot angled vehicle seat kinematics 100 of FIG. 1 from viewpoints A and B, respectively. Some differences will be mentioned.

FIGS. 2-3 are schematically drawn and some components or features of the vehicle seat are omitted or shown at least partially transparent for clarity. In FIG. 2, the seat cushion 102 is shown from the direction A in the position it has in FIG. 1. A silhouette 200 corresponds to the right side, and a silhouette 202 to the left side, respectively, of the seat cushion 102 as shown in FIG. 1. A silhouette 204 corresponds to the right end, and a silhouette 206 to the left end, respectively, of the front frame crossmember 104A as shown in FIG. 1. A silhouette 208 corresponds to the right end, and a silhouette 210 to the left end, respectively, of the rear frame crossmember 104B as shown in FIG. 1. For example, at least one of the front or rear frame crossmembers 104A-104B can have a tube shape. The front and rear links 116A and 126A, and the front and rear lower pivots 114A and 124A, are visible.

In FIG. 3, the seat cushion 102 is shown from the direction B in the position it has in FIG. 1. The front links 116A-116B and the rear links 126A-126B, and the front lower pivots 114A-114B and the rear lower pivots 124A-124B are visible. In FIGS. 2-3, the front lower pivots 114A-114B have a first height compared to the floor rails 106A-106B. The rear lower pivots 124A-124B, on the other hand, have a second height compared to the floor rails 106A-106B, the second height being different from the first height.

Figure 4:
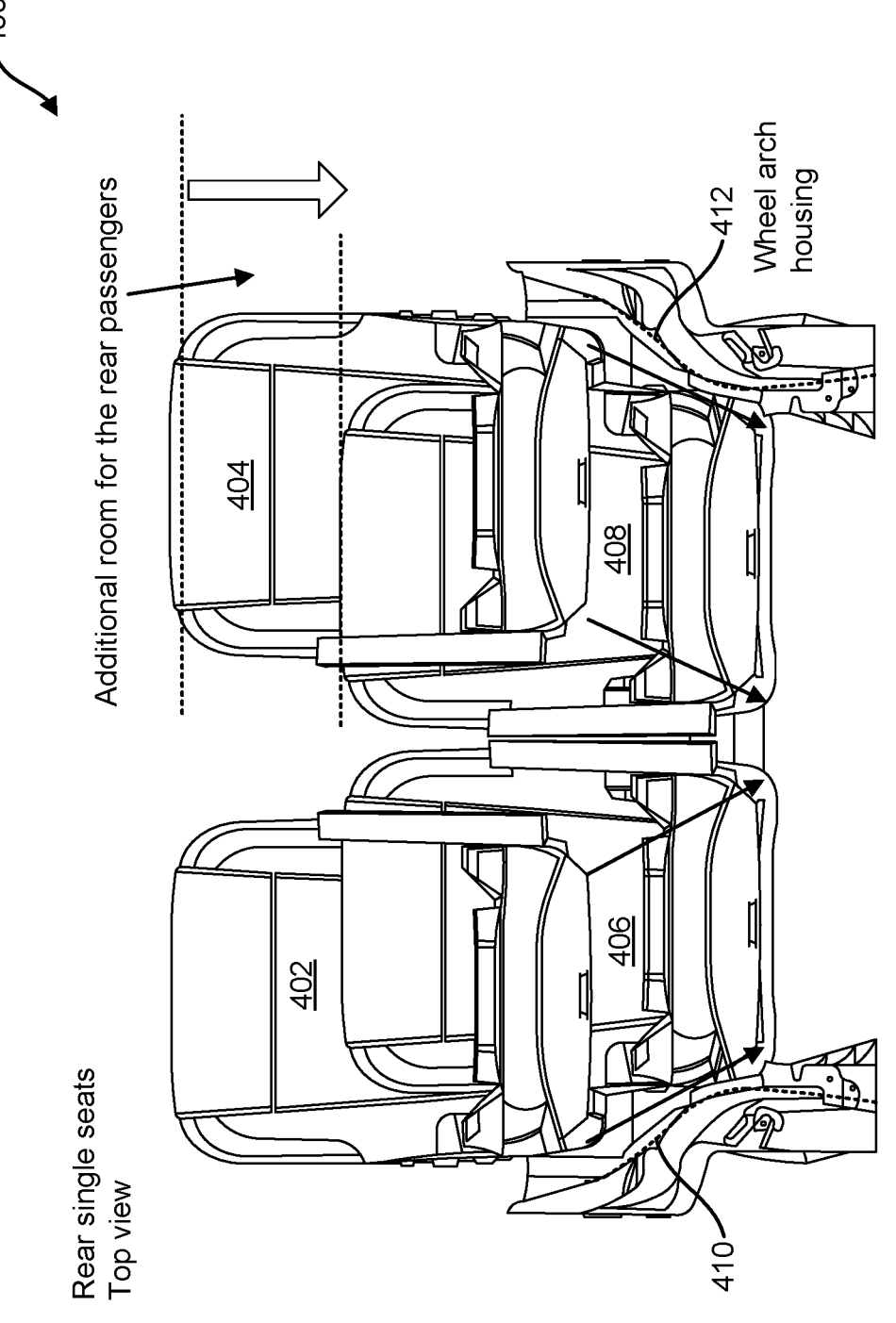
FIG. 4 shows a top view of an example of a vehicle interior with second-row seats in two positions.

FIG. 4 shows a top view of an example of a vehicle interior 400 with second-row seats in two positions. Only part of the vehicle is shown. The vehicle interior 400 can feature any multi-pivot angled vehicle seat kinematics described herein. A position 402 corresponds to a first seat being in a position toward the front of the vehicle, and a position 404 corresponds to a second seat being in a position toward the front of the vehicle. A position 406 corresponds to the first seat being in a position toward the rear of the vehicle, and a position 408 corresponds to the second seat being in a position toward the rear of the vehicle. In some implementations, multi-pivot angled vehicle seat kinematics allow the first seat to assume a lounge position while avoiding a vehicle part 410 (e.g., a wheel housing). Similarly, the multi-pivot angled vehicle seat kinematics allow the second seat to assume a lounge position while avoiding a vehicle part 412 (e.g., a wheel housing). The vehicle interior 400 can therefore provide extra room for rear occupants.

Figures 5A, 5B:
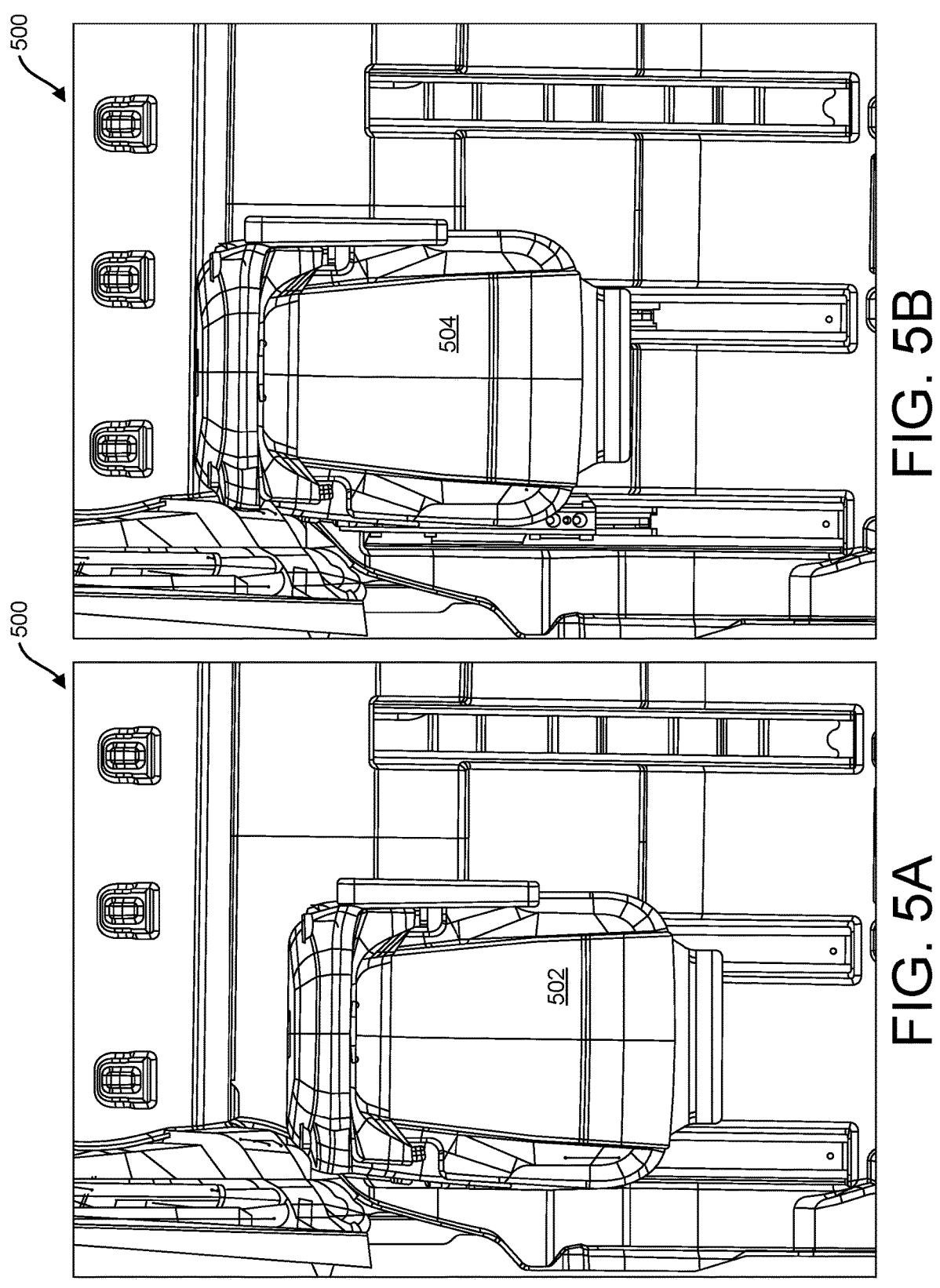
FIGS. 5A-5B show top views of another example of a vehicle interior with a second-row seat in two positions.

FIGS. 5A-5B show top views of another example of a vehicle interior 500 with a second-row seat in two positions. Only part of the vehicle is shown. The vehicle interior 500 can feature any multi-pivot angled vehicle seat kinematics described herein. A position 502 corresponds to a seat being in a position toward the front of the vehicle. The seat is currently facing in the x-direction of the vehicle coordinate system (i.e., in the direction of travel) and is situated in a forward position relatively close laterally to a vehicle door which is at the left of the image, and centered above floor rails. As such, the position 502 can be characterized as a design position for the seat. For example, the design position can be used during vehicle ingress and egress.

A position 504 corresponds to a seat being in a position toward the rear of the vehicle. The seat is currently facing in the x-direction of the vehicle coordinate system (i.e., in the direction of travel) and is situated in a rearward position toward the back of the vehicle, and has been translated inboard relative to the floor rails. As such, the position 504 can be characterized as a lounge position for the seat. For example, the lounge position can be used during travel and vehicle stops.

FIGS. 6A-6D show examples of linear actuation of eight-pivot angled vehicle seat kinematics. The examples can be used with one or more other implementations described elsewhere herein. In these examples, the electric motor 138 and the link 140 (e.g., FIG. 1) are shown for clarity. However, the electric motor 138 and the link 140 can be omitted when any of the following examples are used.

Figures 6A, 6B, 6C, 6D:
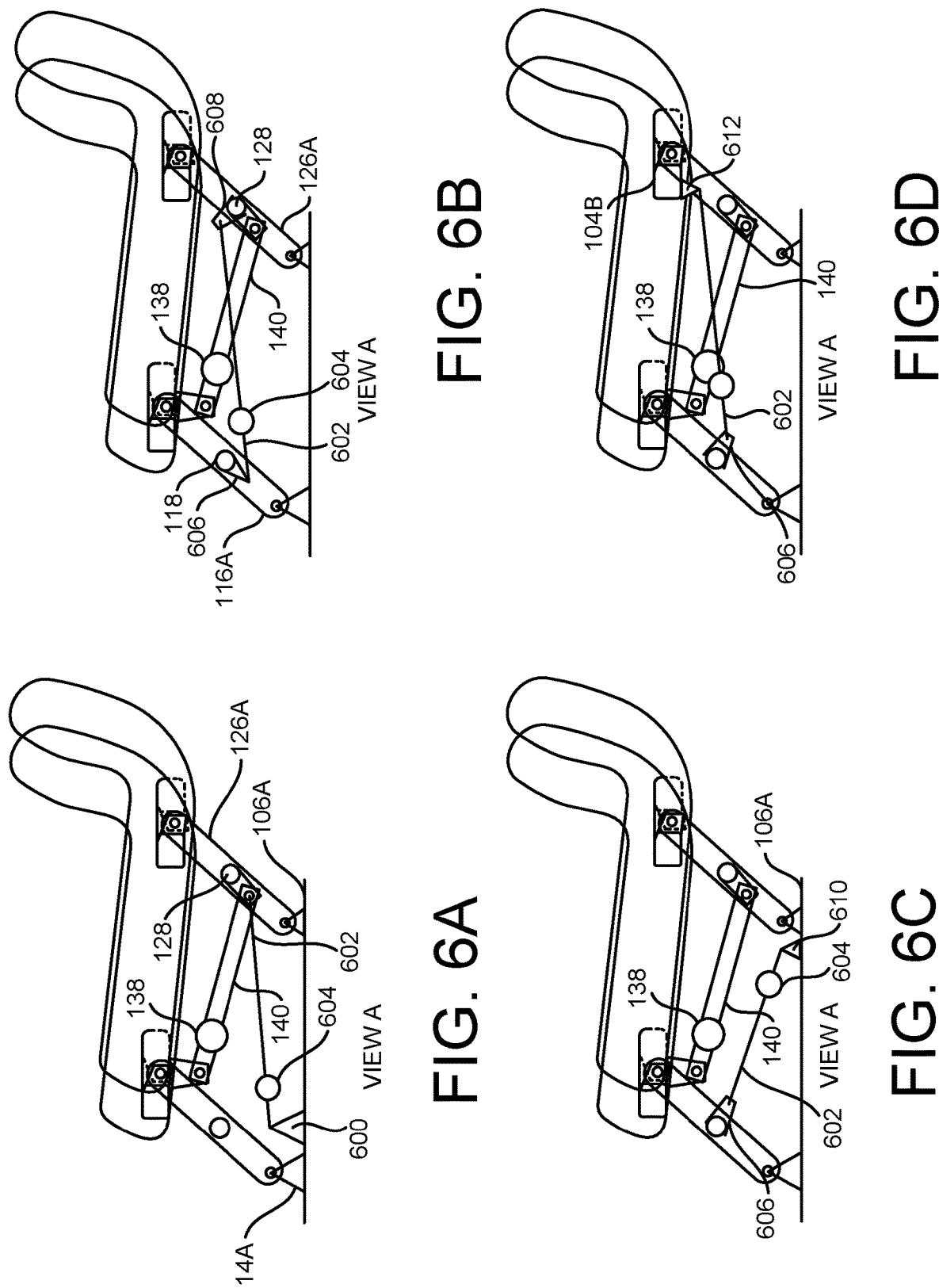
FIGS. 6A-6D show examples of linear actuation of eight-pivot angled vehicle seat kinematics.

FIG. 6A shows that the seat can have a pivot point 600 at the floor rail 106A. A link 602 can couple the pivot point 600 to the rear link 126A. For example, the link 602 can be coupled to a bracket of the rear crossmember 128. An electric motor 604 or other actuator can act on the link 602 to effectuate the kinematics.

FIG. 6B shows that the seat can have a bracket 606 on the front link 116A. For example, the bracket 606 can be coupled to the front crossmember 118. The link 602 can couple the bracket 606 to a bracket 608 on the rear link 126A. For example, the bracket 608 can be coupled to the rear crossmember 128. The electric motor 604 or other actuator can act on the link 602 to effectuate the kinematics.

FIG. 6C shows that the seat can have a pivot point 610 at the floor rail 106A. The link 602 can couple the pivot point 610 to the bracket 606. The electric motor 604 or other actuator can act on the link 602 to effectuate the kinematics.

FIG. 6D shows that the seat can have a pivot point 612 at the rear frame crossmember 104B. The link 602 can couple the pivot point 612 to the bracket 606. The electric motor 604 or other actuator can act on the link 602 to effectuate the kinematics.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other,; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear crossmember coupling the first and second rear links to each other, wherein the first front lower pivot and the first rear lower pivot are positioned vertically above the first floor rail in the first and second positions, wherein the second front lower pivot and the second rear lower pivot are not positioned vertically above the second floor rail in the first and second positions and wherein the front subassembly further comprises (i) a front lateral bracket coupling the second front lower pivot to the second floor rail, and (ii) a rear lateral bracket coupling the second rear lower pivot to the second floor rail; and an electric motor coupled to the eight-pivot angled assembly and configured to actuate the front and rear subassemblies into a first position, and into a second position where the cushion frame and the cushion are positioned further inboard in the vehicle than in the first position.

2. The vehicle seat of claim 1, wherein the cushion frame includes a front frame crossmember that is perpendicular to the first and second floor rails, and wherein the front frame crossmember has a first front bracket for the first front upper pivot, and a second front bracket for the second front upper pivot, the first and second front brackets positioned on opposite sides of the front frame crossmember to create the non-perpendicular angle.

3. The vehicle seat of claim 2, wherein the cushion frame further includes a rear frame crossmember that is perpendicular to the first and second floor rails, and wherein the rear frame crossmember has a first rear bracket for the first rear upper pivot, and a second rear bracket for the second rear upper pivot, the first and second rear brackets positioned on opposite sides of the rear frame crossmember to create the non-perpendicular angle.

4. The vehicle seat of claim 1, further comprising a link to be actuated by the electric motor to move the front and rear subassemblies into the first and second positions.

5. The vehicle seat of claim 4, wherein the electric motor is configured to lengthen or shorten the link.

6. The vehicle seat of claim 1, wherein the first front link, the second front link, the first rear link, and the second rear link, all have a common length.

7. The vehicle seat of claim 1, wherein the first front lower pivot and the second front lower pivot have a first height compared to the first and second floor rails.

8. The vehicle seat of claim 7, wherein the first rear lower pivot and the second rear lower pivot have the first height compared to the first and second floor rails.

9. The vehicle seat of claim 1, wherein the vehicle seat is a second-row seat for the vehicle.

10. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear crossmember coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the link comprises a telescopic link.

11. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assem-bly and configured to actuate the front and rear subas-semblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the electric motor has a lead screw.

12. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assem-bly and configured to actuate the front and rear subas-semblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the electric motor is a spindle motor or a linear actuator.

13. The vehicle seat of claim 12, wherein the first front lower pivot and the first rear lower pivot are positioned vertically above the first floor rail in the first and second positions.

14. The vehicle seat of claim 13, wherein the second front lower pivot and the second rear lower pivot are not posi-tioned vertically above the second floor rail in the first and second positions, and wherein the front subassembly further comprises (i) a front lateral bracket coupling the second front lower pivot to the second floor rail, and (ii) a rear lateral bracket coupling the second rear lower pivot to the second floor rail.

15. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the link extends between the rear crossmember and a position on the cushion frame.

16. The vehicle seat of claim 15, wherein the position is between the first front upper pivot and the second front upper pivot.

17. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the link extends between the rear crossmember and a pivot on the first floor rail.

18. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the link extends between the front and rear crossmembers.

19. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the link extends between the front crossmember and a pivot on the first floor rail.

20. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; and an electric motor coupled to the eight-pivot angled assembly and configured to actuate the front and rear subassemblies into a first position, and into a second position where the cushion frame and the cushion are positioned further inboard in the vehicle than in the first position;

further comprising a link to be actuated by the electric motor to move the front and rear subassemblies into the first and second positions, wherein the electric motor is configured to lengthen or shorten the link, and wherein the link extends between the front crossmember and a position on the cushion frame.

21. A vehicle seat comprising:

a cushion supported by a cushion frame;

an eight-pivot angled assembly configured for fore-aft positioning along first and second floor rails parallel to each other in a vehicle, wherein the cushion and the cushion frame are aligned with the first and second floor rails, the eight-pivot angled assembly comprising:

a front subassembly mounted to the cushion frame at a non-perpendicular angle to the first and second floor rails, the front subassembly comprising (i) a first front upper pivot and a first front lower pivot coupled to each other by a first front link, (ii) a second front upper pivot and a second front lower pivot coupled to each other by a second front link, and (iii) a front crossmember coupling the first and second front links to each other, wherein the first front lower pivot and the second front lower pivot have a first height compared to the first and second floor rails; and a rear subassembly mounted to the cushion frame at the non-perpendicular angle to the first and second floor rails, the rear subassembly comprising (i) a first rear upper pivot and a first rear lower pivot coupled to each other by a first rear link, (ii) a second rear upper pivot and a second rear lower pivot coupled to each other by a second rear link, and (iii) a rear cross-member coupling the first and second rear links to each other; wherein the first rear lower pivot and the second rear lower pivot have a second height com-pared to the first and second floor rails, the second height different from the first height; and an electric motor coupled to the eight-pivot angled assem-bly and configured to actuate the front and rear subas-semblies into a first position, and into a second position where the cushion frame and the cushion are positioned further inboard in the vehicle than in the first position.

\*   \*   \*   \*   \*